United States Patent
Wu

(10) Patent No.: US 6,567,652 B1
(45) Date of Patent: May 20, 2003

(54) MOBILE PHONE HOUSING TOP

(75) Inventor: Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/541,829

(22) Filed: Apr. 3, 2000

(30) Foreign Application Priority Data

Feb. 2, 2000 (TW) ........................................ 89201946 U

(51) Int. Cl.⁷ ................................................ H04B 1/38
(52) U.S. Cl. ........................ 455/90; 455/550; 455/566; D14/137; D14/138; 379/368
(58) Field of Search ...................... 455/550, 90, 566, 455/117, 217, 575; 379/368, 433.07, 428.01; D14/137, 138, 142, 143

(56) References Cited

U.S. PATENT DOCUMENTS

| | | | | |
|---|---|---|---|---|
| D313,413 S | * | 1/1991 | Langton | .................... D14/138 |
| D415,149 S | * | 10/1999 | Vuolteenaho et al. | ...... D14/138 |
| D415,489 S | * | 10/1999 | Ke | ............................. D14/138 |
| D421,004 S | * | 2/2000 | Curtis | ........................ D14/138 |
| D430,127 S | * | 8/2000 | Collins et al. | ............. D14/138 |
| D433,002 S | * | 10/2000 | Kolinen | ...................... D14/138 |
| 6,349,220 B1 | * | 2/2002 | Prior et al. | .................. 455/566 |

* cited by examiner

*Primary Examiner*—Daniel Hunter
*Assistant Examiner*—Lana Le
(74) *Attorney, Agent, or Firm*—Wei Te Chung

(57) ABSTRACT

A mobile phone housing top of the present invention comprises a main body and a front wall, a rear wall, a left wall and a right wall depending from the main body. The main body comprises a speaker section, a display section, and a keypad section including a function key section and a data key section. The data key section comprises a plurality of oblique recesses and a number of data key receiving openings respectively defined in the oblique recesses. The data key receiving openings are aligned with the oblique recesses while at the same time being arranged in a matrix which is conventional for mobile phone data keys. A protrusion is formed between adjacent oblique recesses.

7 Claims, 6 Drawing Sheets

MOBILE PHONE HOUSING TOP

BACKGROUND OF THE INVENTION

1. Field of the Invention

The present invention relates to a mobile phone housing top, and particularly to a mobile phone housing top which is ergonomically designed and which facilitates the entering of information by a user without the user's seeing the keypad thereof.

2. Description of the Prior Art

Mobile phones have been widely accepted as communication devices in recent years because of they are convenient to use outdoors. A mobile phone usually has its data keys on a data key section of its housing top, which comprises a matrix of data key openings corresponding to the arrangement of the data keys for receiving the data keys. The data key section conventionally has a planar top surface without any guiding mechanism for facilitating use of the data keys by touch alone. Therefore, an improved housing top is desired to overcome the disadvantages of the prior art.

SUMMARY OF THE INVENTION

A first object of the present invention is to provide a housing top for a mobile phone which is ergonomically designed;

A second object of the present invention is to provide a housing top for a mobile phone which has a guiding mechanism which facilitates use by touch.

A mobile phone in accordance with the present invention comprises a housing top used as an upper cover portion of its main housing. The housing top comprises a main body including a speaker section, a keypad section and a display section between the speaker section and the keypad section. The keypad section comprises a function key section and a data key section. The data key section is located at the front end of the housing top and the function key section is disposed between the display section and the data key section. The data key section comprises a plurality of oblique recesses and a plurality of data key receiving openings disposed in the respective oblique recesses. There is a protrusion between every two adjacent oblique recesses. The function key section comprises a plurality of function key receiving openings.

Other objects, advantages and novel features of the invention will become more apparent from the following detailed description of the present embodiment when taken in conjunction with the accompanying drawings.

DETAILED DESCRIPTION OF THE INVENTION

Figure 1:
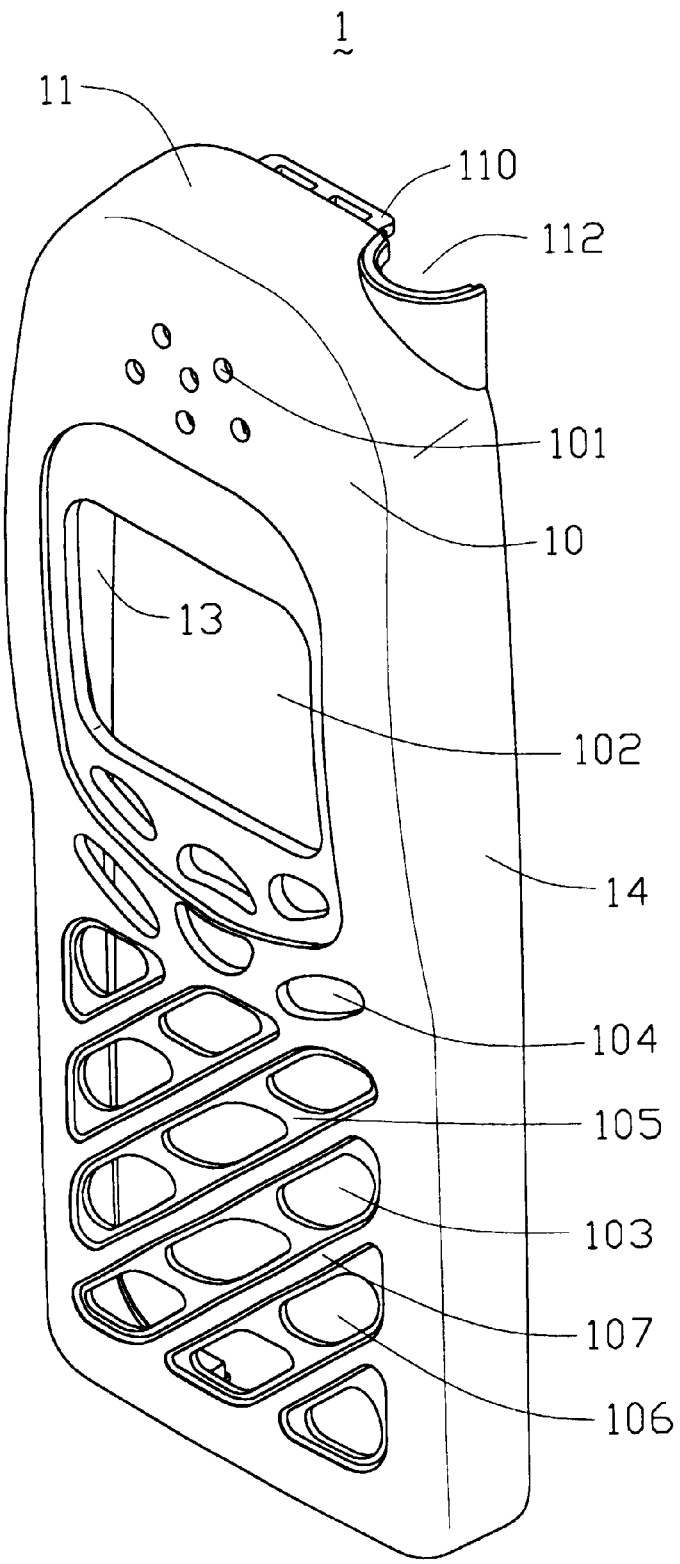
FIG. 1 is a perspective view of a housing top of a mobile phone in accordance with a first embodiment of the present invention.
Figure 2:
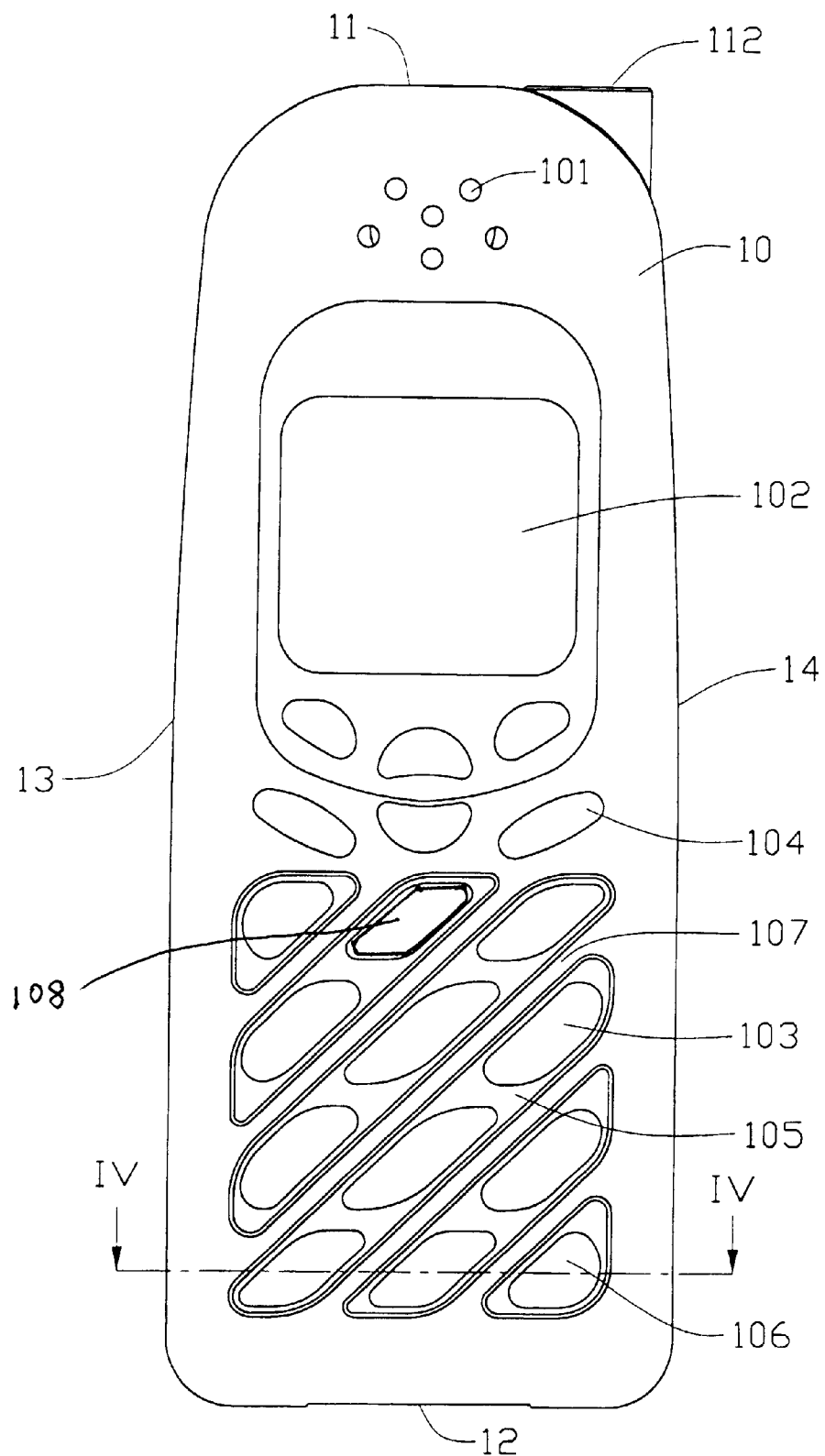
FIG. 2 is a top planar view of the housing top of FIG. 1.
Figure 3:
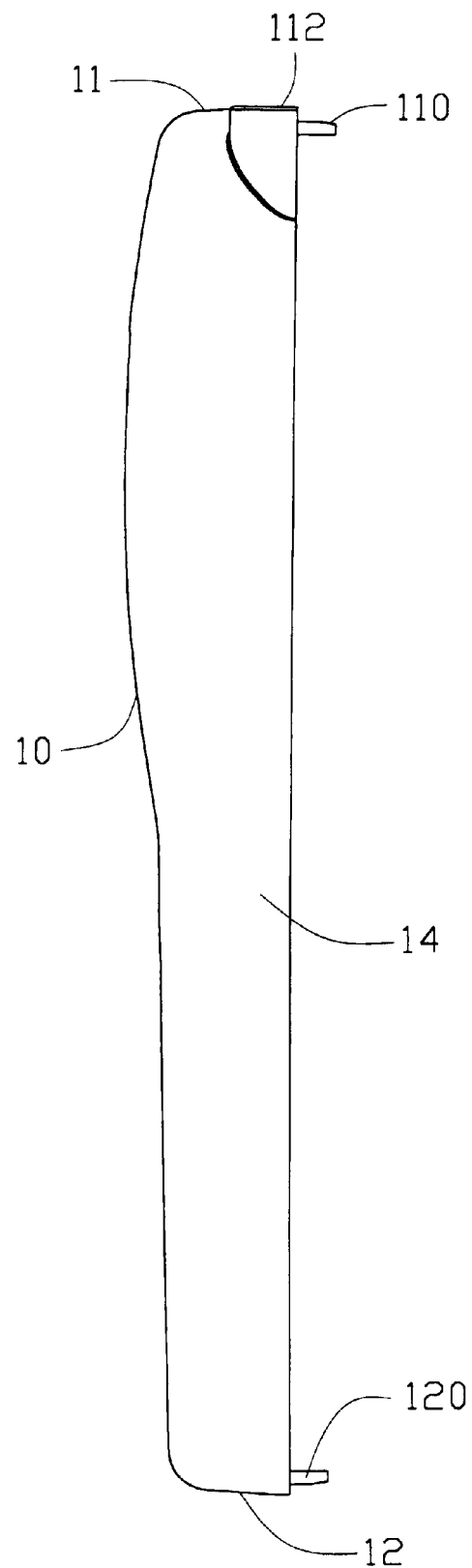
FIG. 3 is a side elevational view of FIG. 1.
Figure 4:
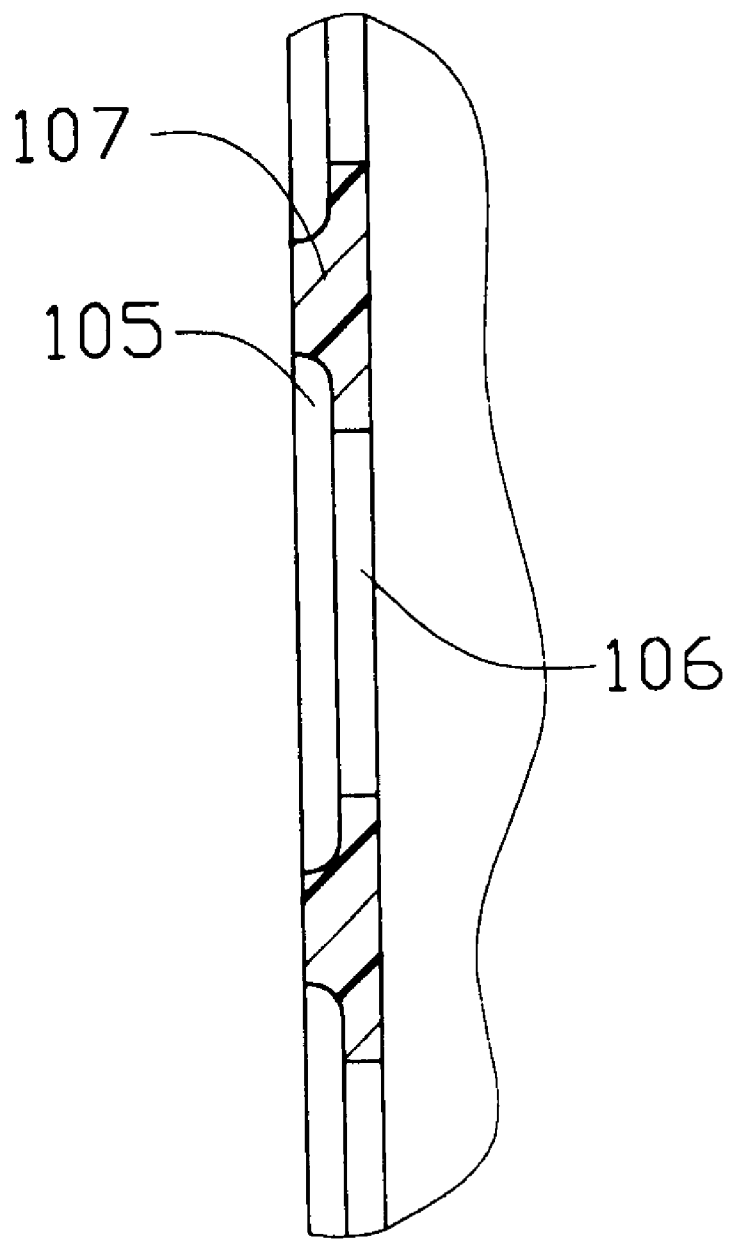
FIG. 4 is a partial cross sectional view taken along line iv—iv of FIG. 2.
Figure 5:
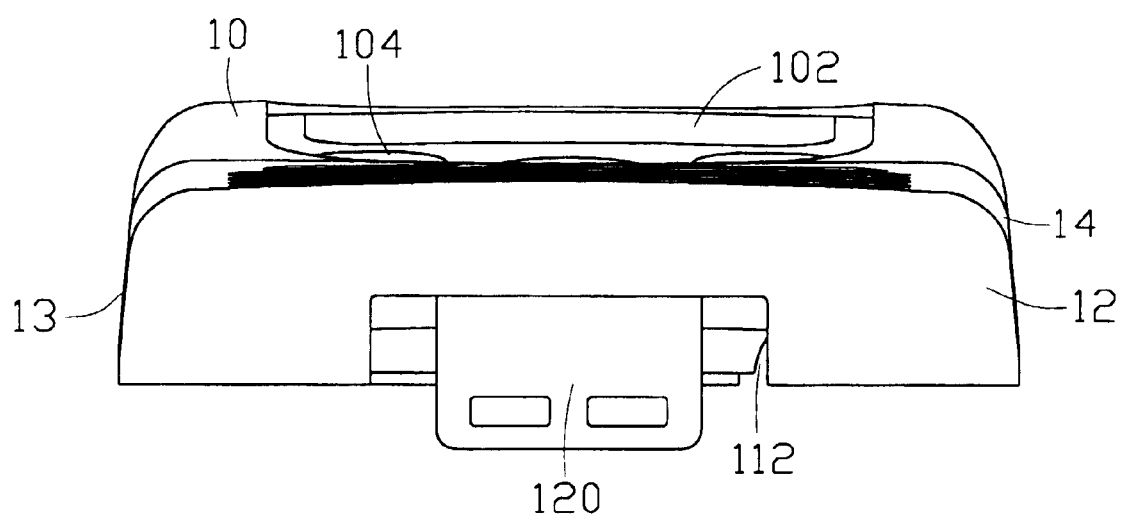
FIG. 5 is a front view of the housing top of FIG. 1.

Referring to FIGS. 1 to 5, a mobile phone housing top 1 in accordance with a first embodiment of the present invention is designed for a user who would like to hold the mobile phone (not shown) by his (her) right hand.

The housing top 1 is an upper cover portion of a mobile phone (not shown) and comprises a main body 10 having a rear wall 11, a front wall 12, a left wall 13 and a right wall 14 perpendicularly depending from four edges of the main body 10, respectively.

The rear wall 11 and the front wall 12 respectively form latch members 110, 120 to engage with complementary structures on a lower cover portion (not shown) of the mobile phone. The lower cover portion together with the housing top 1 encloses the electronic elements of the mobile phone to form a main housing (not shown) of the mobile phone. The rear wall 11 forms a longitudinal channel 112 at a corner thereof adjacent to the right wall 14 for allowing the antenna (not shown) of the mobile phone to extend therethrough.

The main body 10 of the housing top 1 comprises a speaker section 101, a display section 102, a keypad section (not labeled) including a function key section 104 and a data key section 103. The speaker section 101 is near a rear end of the main body 10 and the data key section 103 is near a front end of the main body 10. The display section 102 and the function key section 104 are between the speaker section 101 and the data key section 103, wherein the display section 102 is adjacent to the speaker section 101 while the function key section 104 is adjacent to the data key section 103. The data key section 103 defines six oblique recesses 105, which locate twelve data key receiving openings 106 therein. The data key receiving openings 106 are aligned along the recesses 105 while they are at the same time arranged in a matrix of three columns and four lines, which is conventional for mobile phone key pads. Each of the oblique recesses 105 extends diagonally across the matrix from a lower left corner to an upper right corner thereof. Therefore, the oblique recesses 105 respectively locate one, two or three of the data key receiving openings 106. The data key receiving openings 106 in each oblique recess 105 vary in shape, and respectively receive the corresponding keys 108 therein (only one shown). There is a protrusion 107 between every two adjacent oblique recesses 105. The function key section 104 locates a plurality of function key receiving openings (not labeled) therein which are less frequently depressed by a user.

Figure 6:
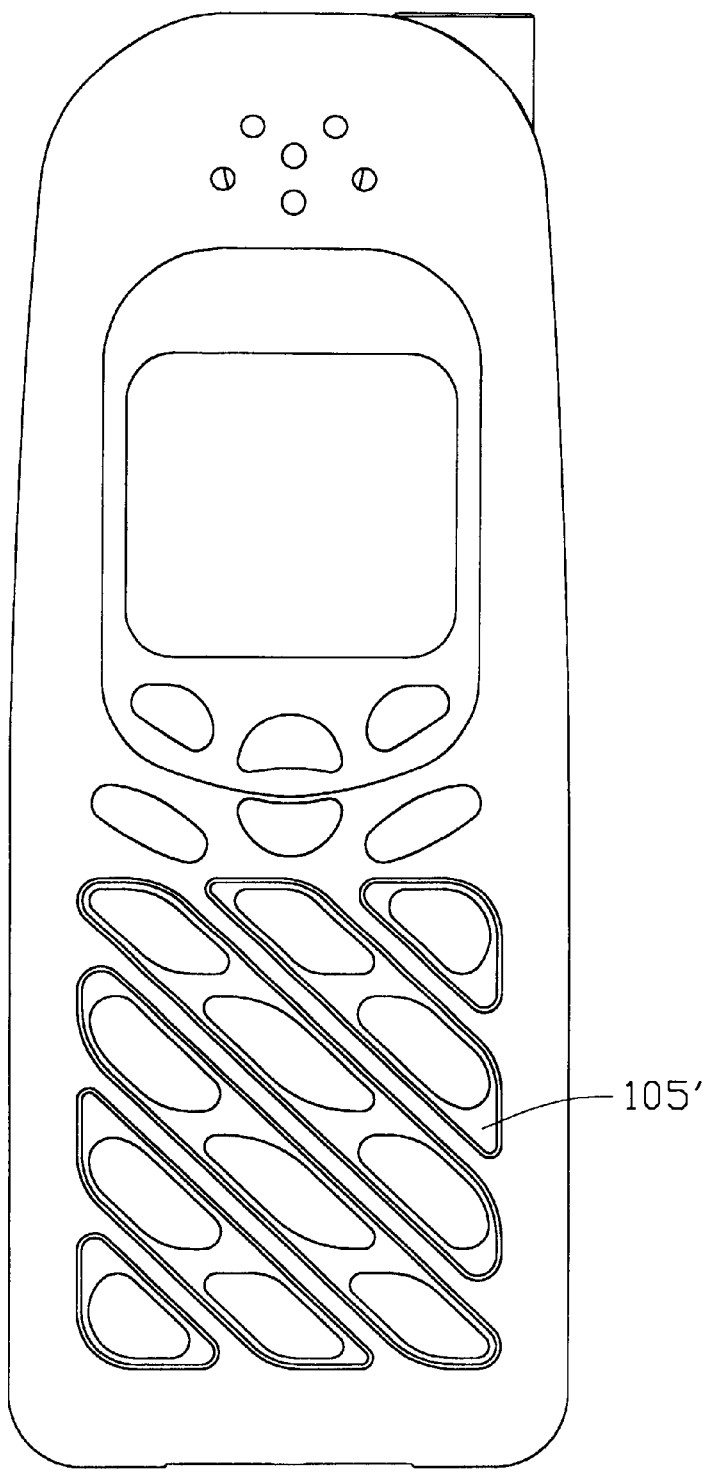
FIG. 6 is a top planar view of a housing top of a mobile phone in accordance with a second embodiment of the present invention.

Referring now to FIG. 6, a mobile phone housing top 1' in accordance with a second embodiment of the present invention is designed for people who would like to hold the mobile phone by their left hand. The mobile phone housing top 1' of the second embodiment is similar to the mobile phone housing top 1 of the first embodiment except that the oblique recesses 105' of the housing top 1' extend diagonally across the data key receiving opening matrix from an upper left corner to a lower right corner thereof.

The oblique recesses 105/105' extend in directions in compliance with the direction of movements of the users' fingers, and the data key receiving openings 106 located at different positions within the oblique recesses 105/105' are each differently shaped, so the mobile phone housing top 1/1' can provide a guiding function, thereby permitting a user to operate the keys by touch without seeing the keypad. The protrusions 107 between adjacent oblique recesses 105 further enhance the guiding function of the housing top 1/1' for use by touch. The data key receiving openings 106 are also arranged in the conventional matrix, so the housing top 1/1' can be fitted to a conventional mobile phone without altering the interface therebetween. In addition, the different diagonal slants of the recesses 105 and 105' provide alternatives for people preferring left or right hand use.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile phone housing top comprising a main body comprising:

a speaker section on a rear end thereof;

a keypad section on a front portion thereof, the keypad section having a data key section, the data key section comprising a plurality of oblique recesses and a plurality of aligned data key receiving openings respectively located in the oblique recesses for receiving data keys mainly composed of number keys, and the oblique recesses having different shapes from one another; and a display section disposed between the speaker section and the keypad section.

2. The housing top of claim 1, wherein the data key receiving openings are arranged in a matrix and are aligned in longitudinal and transverse directions of the main body.

3. The housing top of claim 2, wherein the data receiving openings in each oblique recess vary in shape.

4. The housing top of claim 2, wherein the oblique recesses extend in directions diagonal to the matrix formed by the data key receiving openings.

5. The housing top of claim 1, wherein a protrusion is formed between every two adjacent oblique recesses.

6. An arrangement of a keypad section of a phone comprising:

a plurality of matrix type openings formed in a main body of the phone, said matrix type openings generally arranged to be aligned with one another in both vertical and horizontal directions, said matrix type openings further defining a diagonal direction oblique to both the vertical and horizontal direction; and a plurality of recesses formed in the main body above the openings; wherein said recesses are parallel with each other along said diagonal direction, and the recesses have different shapes from one another.

7. The arrangement of claim 6, wherein a key is received within each of said openings and extends into the corresponding recess thereabove.

\* \* \* \* \*